United States Patent [19]

MacDonald

[11] 4,453,567

[45] Jun. 12, 1984

[54] VALVE ASSEMBLY

[75] Inventor: Robert D. MacDonald, Mesa, Ariz.

[73] Assignee: Masco Corporation, Taylor, Mich.

[21] Appl. No.: 362,902

[22] Filed: Mar. 29, 1982

[51] Int. Cl.³ .............................................. F16K 11/00
[52] U.S. Cl. ........................ 137/614.11; 137/625.17;
          137/625.41; 251/DIG. 1
[58] Field of Search ................... 137/625.17, 614.11,
          137/625.41; 251/310, DIG. 1, 363

[56] References Cited

U.S. PATENT DOCUMENTS

| | | | |
|---|---|---|---|
| 3,009,679 | 11/1961 | Williams | 251/363 |
| 3,023,784 | 3/1962 | Monson | 137/625.17 |
| 3,331,396 | 7/1967 | Willis | 137/625.31 |
| 3,433,264 | 3/1969 | Parkison | 137/625.17 |
| 3,645,493 | 2/1972 | Manoogian et al. | 251/120 |
| 3,674,048 | 7/1972 | Manoogian et al. | 137/625.41 |
| 3,780,758 | 12/1973 | DeVries | 137/625.46 |
| 3,788,601 | 1/1974 | Schmitt | 251/304 |
| 3,921,659 | 11/1975 | Rudewick | 137/625.41 |
| 4,327,758 | 5/1982 | Uhlman | 137/625.17 |

*Primary Examiner*—A. Michael Chambers
*Attorney, Agent, or Firm*—Steven L. Permut; E. Dennis O'Connor; Leon E. Redman

[57] ABSTRACT

A valve assembly has a first ceramic valve member having a flat valving surface. An aperture open to the valving surface is provided through the valve member. The valve assembly further has a tubular valve member having an aperture therethrough, and an annular valving surface adjacent to the valving surface of the other valve member. The apertures through the respective valve members are moved into and out of registry with each other by relative movement therebetween. Preferably, a valve body is provided having a large bore accepting the first valve member and a small bore accepting the tubular valve member. The apertures are movable into and out of registry by rotation of the first valve member within the large bore.

10 Claims, 13 Drawing Figures

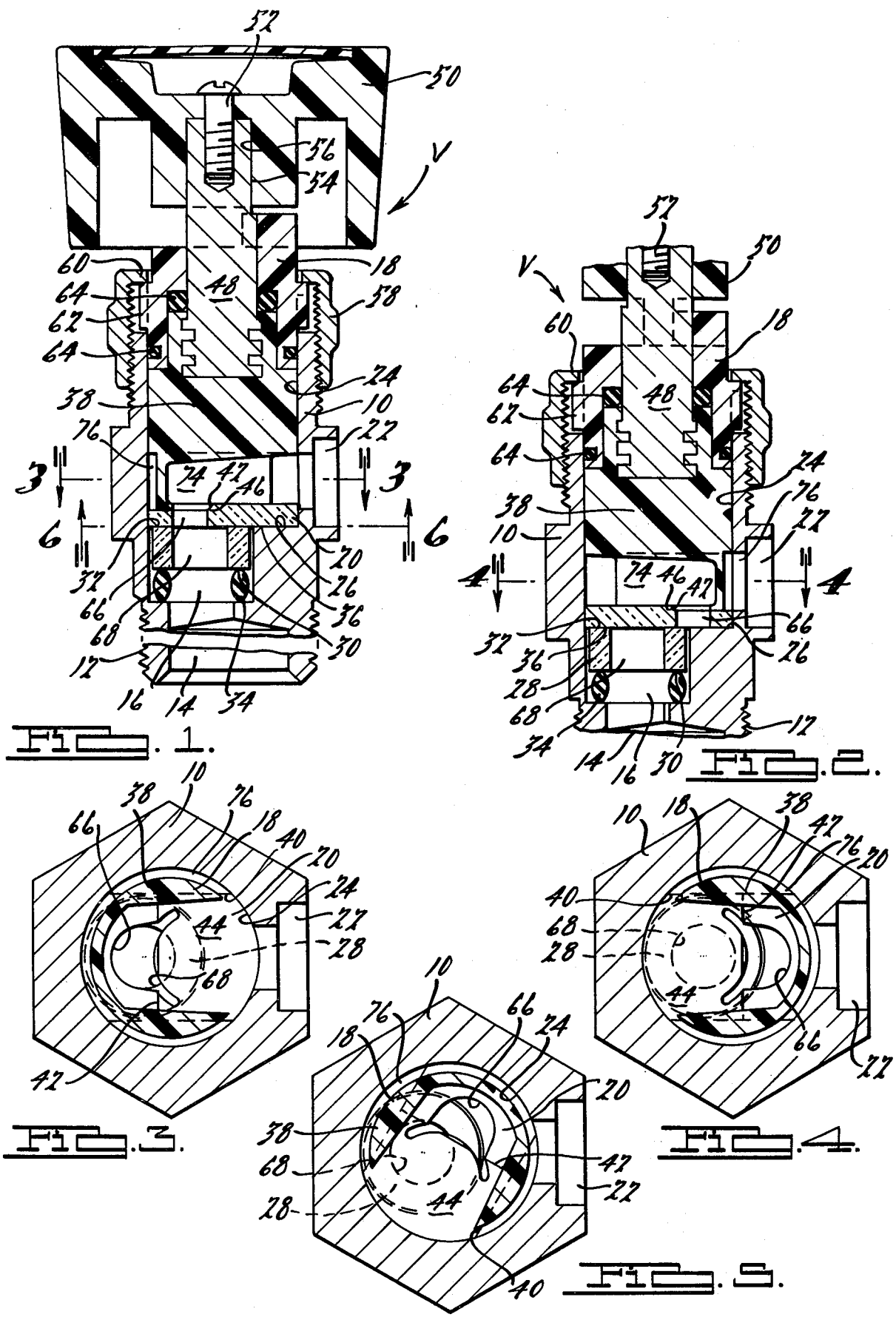

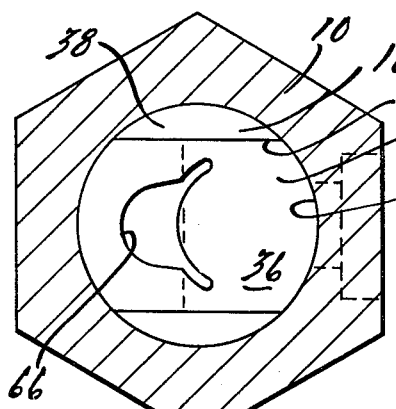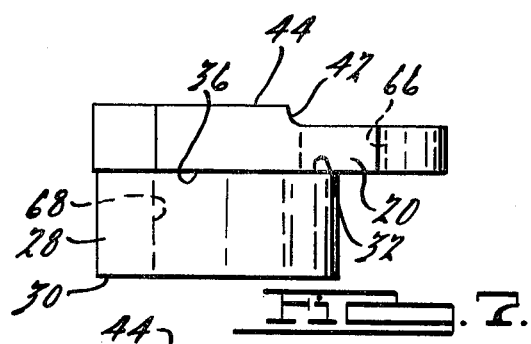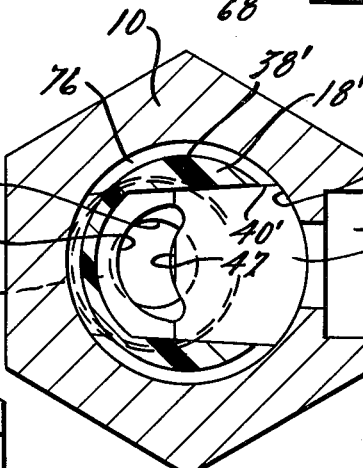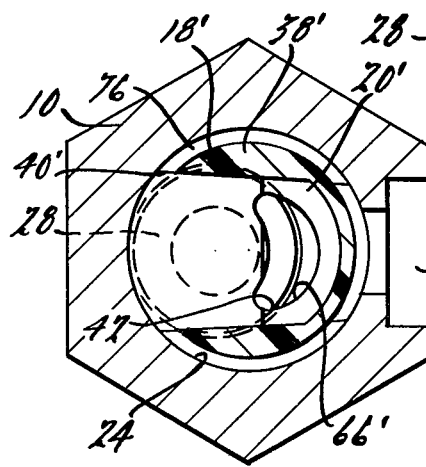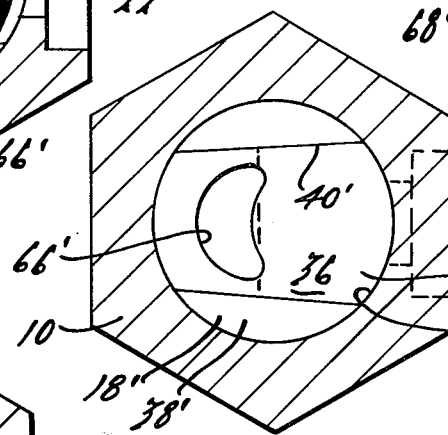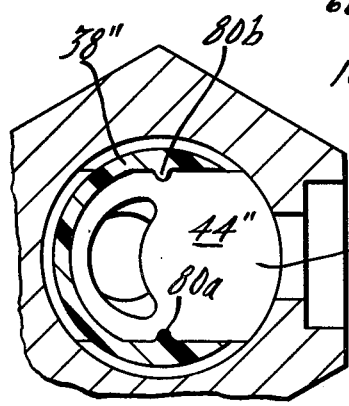

VALVE ASSEMBLY

BACKGROUND

The present invention relates generally to improvements in faucet valves of the kind in which a separate valve assembly is provided for the hot water supply and for the cold water supply. The present invention more particulary relates to valve assemblies wherein a first valve member is rotated relative to a valve body or relative to a second valve member associated with the valve body and wherein there is no compression or distortion of the valve member during normal operation.

Several valve assemblies have been described in the past, both for faucets and for general utility applications, wherein both the valve seat and the valve member are made from a long wearing ceramic material that has been lapped and honed to provide extremely flat valving surfaces that can slide against one another to selectively seal liquid under pressure. In such valve assemblies, the valve seat can often be thought of as a second valve member since its function differs only slightly from the first valve member, one member being stationary and the other member being selectively movable. A recurring difficulty with these valve assemblies is that abrasive particles may become trapped between the interacting surfaces of the valve members and score one at both of the surfaces. This scoring can eventually lead to leakage between the valve members. The present invention provides a valve assembly of this type with a reduced tendency to leak.

An example of a valve of the prior art to which the improvements of the present invention are applicable is disclosed in U.S. Letters Pat. No. 3,645,495, issued Feb. 29, 1972, hereinafter "Manoogian et al". The type of valve disclosed therein has been manufactured for several years and currently exists in numerous installations. The type of valve disclosed therein, as modified according to the present invention, comprises the best mode contemplated by the inventor at the time of filing the present application for carrying out the invention. This valve, as so modified, is therefore illustrated in the attached drawing and is described below as the preferred embodiment.

A primary object of the present invention is to provide a ceramic valve assembly that has a reduced tendency to trap abrasive particles for extended periods of time, and thereby, has a reduced tendency to leak.

Another object of the present invention is to provide a ceramic valve assembly where the ceramic elements are inexpensive to manufacture and easy to replace.

Still another object of the present invention is to provide a ceramic valve assembly that may be used as an upgrading subassembly for faucets of the type disclosed in Manoogian et al.

SUMMARY OF THE PRESENT INVENTION

The present invention comprises a valve assembly having two ceramic valve members. The first valve member has a flat valving surface and a aperture therein. The second valve member is tubular in shape and has an annular valving surface and a aperture therein. The valving surfaces are parallel to each other and adjacent to each other. The apertures are moved into and out of registry by movement of one valve member relative to the other valve member.

In the preferred embodiment, the valve assembly of the present invention comprises a faucet valve wherein the first valve member is located in a first bore in a valve body. The first valve member is interconnected with a valve stem that permits manual rotation of the first valve member within the first bore. The first valve member has a vertically disposed aperture through its valving surface and offset from its axis of rotation. The tubular shaped or second ceramic valve member is located within a second bore in the valve body. The second bore is smaller than the first bore, has its longitudinal axis parallel to the longitudinal axis of the first bore and offset therefrom and interconnects the first bore and the exterior of the valve body. The aperture in the first valve member is movable into and out of registry with the aperture in the second ceramic valve member by rotation of the valve stem relative to the valve body about its longitudinal axis.

BRIEF DESCRIPTION OF THE DRAWING

The many objects, features and advantages of the present invention will become apparent to one skilled in the art when the following detailed description of the preferred embodiment is read together with the attached drawing, wherein like reference numerals refer to like components throughout and wherein:

FIG. 1 is a vertical sectional view through a faucet valve embodying the valve assembly of the present invention and showing the valve in its full open position;

FIG. 2 is a fragmentary sectional view similar to FIG. 1 but showing the valve assembly in its closed position;

FIGS. 3 and 4 are sectional views taken along line 3—3 of FIG. 1 and along line 5—5 of FIG. 2, respectively;

FIG. 5 is a sectional view similar to FIGS. 3 and 4 but illustrates the valve in a partially open position intermediate the positions illustrated in FIGS. 3 and 4;

FIG. 6 is a bottom view of the stem assembly;

FIGS. 7 and 8 are side and front elevational views, respectively, of the two ceramic valve members;

FIGS. 9, 10, 11, and 12 are views similar to FIGS. 3, 4, 5 and 6, respectively, but illustrating a modified valve assembly; and FIG. 13 is a partial view similar to FIG. 3 but illustrating another modified valve assembly.

DETAILED DESCRIPTION OF THE PREFERRED EMBODIMENT

Refer now to the drawing and more particularly to FIGS. 1 and 2 thereof. The faucet valve V of the type described in Manoogian et al, comprises a generally cylindrical valve body 10 having a lower externally threaded portion 12 adapted to be connected in a conventional manner to either a supply of pressurized hot or cold water. The pressurized water flows upwardly through a central bore 14 in the portion 12 of the valve body 10 to a larger diameter bore 16. From the bore 16, the water flows upwardly through the interior of a rotatable stem assembly 18, which includes a first valve member 20, described later. The water flows from the interior of the stem assembly 18 to an outlet port 22. The upper end of the valve body 10 is provided with a cylindrical bore 24 having a flat bottom wall 26. The stem assembly 18 is rotatable within the cylindrical bore 24 with the valve member 20 resting on the bottom wall 26.
}

A suitable length of tubing, not shown, is adapted to have one of its ends connected to the outlet port 22 of the valve body 10. This tubing leads to a common discharge spout, well known in in the art and therefore not shown. The spout may be similarly connected to another faucet valve, also not shown, which is of identical construction to the faucet valve V illustrated.

The longitudinal axis of the bore 16 described above is parallel to the axis of the bore 24 and is offset therefrom. In Manoogian et al, a spring loaded valve seat is inserted in the bore 16. According to the present invention, and as illustrated in the drawing, a second valve member 28 is provided in lieu of such a seat. The valve member 28 is tubular in shape and is adapted to fit into the bore 16. The valve member 28 is comprised of a suitable ceramic material such as, for example, aluminized ceramic AD-96-made by the Coors Porcelain Company of Golden, Coloado. Other suitable materials will be apparent to those skilled in the art.

The valve member 28 has two annular surfaces 30 and 32 and a central aperture 74. At least one of these surfaces (and preferably both) is honed and lapped to a desired smoothness. The valve member 28 has its bottom surface 30 seated against the top of an seal 34, also disposed within the bore 16. The seal 34 is made of a suitable resilient material and is similar to an O-ring except that it has an oval cross-section, as best illustrated in FIGS. 1 and 2. The seal 34 is slightly compressed during use and urges the upper surface 32 of the valve member 28 upwardly against the lower surface 36 of the valve member 20.

According to the present invention, the first valve member 20 comprises a generally rectangular and thin member which is also comprised of a suitable ceramic material. The lower surface 36 of the first valve member 20 is honed and laped to a desired smoothness similar to that of the upper surface 32 of the tubular valve member 28. The first valve member 20 is provided with a crescent shaped aperture 66 (FIGS. 3-5). Alternatively, the aperture 66' could be sausage shaped, as shown in FIGS. 9, 10, 11 and 12.

The relationship between the valve members 20 and 28 is illustrated in FIGS. 7 and 8. As is well known in the art, the surfaces 32 and 34 will form a seal between each other when they are in contact. The valving function of the faucet valve V occurs between the smoothed surfaces 32 and 34. Therefore, these surfaces will be referred to as the valving surfaces 32 and 34 in the remainder of this description.

The first valve member 20 is interconnected with an adapter 38. The adapter 38 is cylindrical in shape and may be comprised of plastic or other suitable material. The first valve member 20 is attached to the adapter 38 by being inserted into a rectangular slot 40 (FIG. 6) or a trapezoidal slot 40' (FIG. 10) in the adapter 38 or 38'. A step 42 (FIGS. 7 and 8) is provided in the top surface 44 of the first valve member 20. A similar step 46 is provided in the adapter 38 (FIG. 4) which cooperates with the step 42 to prevent accidental backwards installation of the valve member 20. The adapter 38 is provided with a discharge passage 68 open to the aperture 66 in the valve member 20.

The outer end of the discharge passage 68 is adapted to be aligned with the outlet port 22 in the valve body 10 when the stem assembly is in the fully open position shown in FIGS. 1 and 3. In this same orientation of the stem assembly 18, the aperture 66 in the first valve member 20 has its maximum communication with the aperture 74 in the second valve member 28. The exterior surface of the adapter 38 is provided with a portion of reduced diameter which defines a narrow cylindrical channel 76 between the adapter 38 and the valve body 10 which extends completely around the adapter 38. The size of the channel 76 is somewhat exaggerated in the drawings for clarity.

An operating stem 48 is fastened to the adapter 38. The valve members 20 and 28, the adapter 38 and the operating stem 48 together comprise the stem assembly 18. An operating handle 50 is secured to the upper end of the stem 48 by a screw 52. A flat surface 54 on the upper end of the stem 48 engages a correspondingly shaped portion of an opening 56 in the handle 50 to prevent relative rotation between the handle 50 and stem 48.

A collar 58 is threaded onto the upper end of the valve body 10 and has its top wall 60 engaging the upper surface of a shoulder 62 on the adapter 38 so that when the collar 58 is tightened, the first valve member 20 will be positioned a small distance above the bottom wall 26 of the bore 24 in the valve body. An O-ring 64a provides a seal between the adapter 38 and the valve body 10. Another O-ring 64b surrounds the valve stem 48 and provides a seal between the valve stem and the adapter 38.

The other details of the construction, assembly and function of handle 50, valve body 10 and the stem assembly 18 may be generally identical to the details of the corresponding components in Manoogian et al except where indicated herein and will therefore not be repeated here.

The valve assembly is shown in FIGS. 2 and 4 in its closed position in which it will be seen that the opening 66 in the first valve member 20 is out of registry with the opening 74 in the second valve member 28, which opening defines the inlet port. In FIG. 5, the valve member 20 is shown in a position in which its aperture 66 has just begun to communicate with the aperture 74, assuming counterclockwise rotation of the first valve member 20 as viewed in FIG. 7. When the stem assembly 18 is rotated, the bottom surface of the valve member 20 rotates over the second valve member 28 while the seal 34 urges the second valve member 28 into sealing engagement with the first valve member 20.

The second valve member 28 is, as previously mentioned, tubular in shape. The shape offers several advantages. The tubular element is inexpensive to manufacture in large quantities. Both the top surface 32 and the bottom surface 30 may be laped and honed to the desired smoothness so that an installer will not have to be concerned about assembling the valve assembly with the tubular valve member upside down and so that the tubular valve element is reversible and will therefore last longer than a valve member with only one usable surface.

FIG. 13 illustrates an alternate configuration for the first valve member. The second valve member 28″ illustrated has notches 80a and 80b to align the valve member relative to the modified adapter 38″. In this example, the step 42 (FIG. 7) is not provided. Instead, the upper surface 44 is lapped and honed to the same smoothness as the lower surface 36 so that the valve member is reversible.

It should be noted that the tubular valve member 28 has a relatively small annular valving surface 32 which can be held to very strict flatness tolerances overall and will therefore have a reduced tendency to leak. The small annular surface 32 will not trap particles very long that may score either valving surface. Most particles should be moved out of the area of contact of the valving surfaces during one cycle of use. Finally, the tubular valve member 28 can move a short distance and rotate within the bore. Under some circumstances, a large particle will import a torque to the tubular valve member and rotate it instead of scoring it. The sharp corner, shown at 70 in FIG. 7, aids in reducing the tendency of particles to enter the region between the two valving surfaces.

The present invention thereby provides a ceramic valve assembly that has a reduced tendency to be scored by particles and, thereby, has a reduced tendency to leak. The present invention provides a ceramic valve assembly where the ceramic elements are inexpensive to manufacture and easy to replace. Finally, it is readily apparent that the present invention provides a ceramic valve subassembly that may be used to upgrade faucets of the type disclosed in Manoogian et al.

The above describes the present invention by means of the best mode contemplated by the invention at the time of filing the application. Variations and modifications therefrom will be apparent to those skilled in the art and are intended to be included within the scope of the claims appended hereto.

What is claimed as novel is as follows:

1. A faucet valve comprising a valve body, a first bore in said valve body, a second bore in said valve body smaller than said first bore and opening into and offset from the longitudinal axis of said first bore, an outlet passageway in said main body open to said second bore, a first valve member rotatable in said bore and having a flat valving surface, an inlet passageway through said first valve member and offset from the axis of rotation of said valve member open to said valving surface, a second passageway through said first valve member open to said inlet passageway in said first valve member and capable of registry with said outlet passageway in said valve body and, a tubular valve member in said second bore and having a flat annular valving surface and an inlet passage therethrough communicating with such inlet port;

wherein upon rotation of said first valve member, its inlet passage is brought into and out of registry with said inlet passageway in said tubular valve member, said second passageway through said first valve member being in registry with said outlet passageway through said main body in at least some of the rotational positions of the first valve member wherein the inlet passageway of the two valve members are in at least partial registry; and a resiliently compressible O-ring seal interposed in ciompression between said tubular valve member and said valve body for biasing said tubular valve member against said first valve member and sealing between said tubular valve member and said valve body.

2. The faucet valve of claim 1 wherein at least one of said valve members is comprised of a ceramic material.

3. The faucet valve of claim 1 wherein said tubular valve member has two flat surfaces and is reversible.

4. A valve assembly comprising a first valve body, a bore in said first valve body, an inlet passageway in said first valve body leading from a supply of water under pressure to said bore, a tubular ceramic valve member located in said bore and having an inlet passageway therethrough and a flat annular surface facing outside of said bore, a second valve body movably fastened to said first valve body, a second ceramic valve member interconnected with said second valve body and having a flat valving surface coplanar with said annular surface and adjacent thereto, an outlet passageway through said second ceramic valve member having a port in said valving surface, selectively operable drive means for moving one of said valve bodies relative to the other of said valve bodies;

wherein said valving surface of said second ceramic valve member remaining coplanar with said annular surface of said tubular valve member when said one valve member is moved and further wherein said outlet passageway through said second ceramic valve member is capable of registering with the passageway through said tubular valve member in a first relative position of said valve member and not registering therewith in a second relative position; and a resiliently compressible O-ring seal interposed in compression between said tubular ceramic valve member and said first valve body for biasing said tubular ceramic valve member against said second ceramic valve and retaining a seal between the tubular ceramic valve member and the first valve body.

5. The valve assembly of claim 1 wherein said tubular ceramic valve member has two flat valving surfaces and is reversible.

6. A faucet valve comprising a valve body, a cavity in said valve body, a bore opening into said cavity, said bore having a diameter smaller than said cavity; an outlet passageway in said valve body leading from said cavity to an outlet port, an inlet passageway in said valve body leading from a supply of water under pressure to said bore, a first ceramic valve member located in said cavity and movable therein, a flat surface on first ceramic valve member, a tubular ceramic valve member located in said bore, a flat annular surface on said tubular valve member located outside of said bore, selectively operable drive means for moving said first valve member relative to the valve body wherein said flat surface of said first valve member remains coplanar with said flat annular surface of said tubular valve member when said first valve member is moved, an inlet port in said first valve member capable of registering with a longitudinal passageway through said tubular valve member in a first position of the first valve member relative to said valve body and not registering therewith in a second position of the first valve member relative to the valve body, an outlet port in said first valve member capable of registering with said outlet passageway in said valve body in at least said first position of said first valve member, a passageway through said first valve member interconnecting the inlet port with the outlet port thereof; and a resiliently compressible O-ring seal interposed in compression between an opposite annular end of said tubular ceramic valve member and said valve body for biasing said tubular ceramic valve member against said second ceramic valve and sealing between the tubular ceramic valve member and the valve body.

7. The faucet valve of claim 6 wherein said tubular ceramic valve member has two flat valving surfaces and is reversible.

8. A valve assembly for a faucet having a valve body, a first bore in said valve body, an inlet passageway in said valve body leading from a supply of water under pressure to said first bore, a second bore in said valve body substantially larger than said first bore opening into said first bore and extending parallel to said first bore and offset therefrom, and an outlet passageway in said valve body leading from said second bore, said valve assembly comprising:

a stem body having at one end a cylindrical portion capable of being inserted into and capable of being rotated within said second bore about the longitudinal axis of said stem body, a first ceramic valve member interconnected with said one end of said stem body, a flat valving surface on said first valve member on its portion furthest from said stem body and perpendicular to said longitudinal axis, a passageway through said first valve member having an opening in the valving surface offset from said longitudinal axis, an outlet passageway through said valve body, a tubular ceramic valve member positioned in said second bore, a passageway through said valve member coaxial with the valve member, and a flat annular valving surface of said tubular ceramic valve member facing into said second bore; and a resiliently compressible O-ring seal interposed in compression between said tubular ceramic valve member and said valve body for biasing said tubular ceramic valve member against said first valve member and retaining sealing between the tubular ceramic valve member and the valve body;

whereby said valving surfaces are adjacent to each other and said passageways through said valve members are moved into and out of registry with each other by rotation of said stem body.

9. The stem assembly of claim 8 wherein said tubular has two valving surfaces and is reversible.

10. A valve assembly comprising a housing having a central chamber open at one chamber extremity and a wall closing the chamber extremity most remote from the open extremity, a bore extending through said wall and interconnected with a source of fluid under pressure, a tubular first ceramic member having a central passageway therethrough, said first ceramic member positioned in said bore and having a first valving surface proximate said chamber, a movable control assembly positioned partially in said chamber and extending from the open extremity of said chamber, a second ceramic member carried by said control assembly for unitary movement therewith and positioned in said chamber proximate said wall, said second ceramic member having a second valving surface cooperating with said first valving surface to control the flow of water into said chamber, aperture means extending through said second ceramic member and selectively registerable with a discharge passageway formed through said housing and said central bore and resiliently compressible O-ring seal positioned in said bore and bearing on said first ceramic member to urge said first valving surface of said first ceramic member into intimate contact with the second valving surface of said second ceramic member and to seal said first ceramic member with respect to said bore.

* * * * *